United States Patent
Kaufman

(10) Patent No.: US 7,018,532 B2
(45) Date of Patent: Mar. 28, 2006

(54) AERATION AND MIXING TROUGH

(76) Inventor: Michael J. Kaufman, 265 Four Seasons Rd., Boswell, PA (US) 15531

(*) Notice: Subject to any disclaimer, the term of this patent is extended or adjusted under 35 U.S.C. 154(b) by 260 days.

(21) Appl. No.: 10/764,474

(22) Filed: Jan. 27, 2004

(65) Prior Publication Data

US 2005/0161383 A1    Jul. 28, 2005

(51) Int. Cl.
*C02F 1/52*    (2006.01)
*C02F 7/00*    (2006.01)

(52) U.S. Cl. ............... 210/205; 210/206; 210/219; 210/154; 366/337

(58) Field of Classification Search ........... 210/205, 210/206, 219, 154, 162; 366/337, 340, 181.5
See application file for complete search history.

(56) References Cited

U.S. PATENT DOCUMENTS

| | | | |
|---|---|---|---|
| 1,861,031 A * | 5/1932 | Schmitt | 405/35 |
| 2,310,009 A * | 2/1943 | Baker et al. | 210/723 |
| 2,673,451 A | 3/1954 | Gariel | |
| 2,817,440 A | 12/1957 | Casner et al. | |
| 3,826,740 A | 7/1974 | Jewett | |
| 4,536,293 A | 8/1985 | Babineaux, III | |
| 5,069,885 A | 12/1991 | Ritchie | |
| 5,492,620 A | 2/1996 | Evans | |
| 5,558,764 A * | 9/1996 | Romo | 210/220 |
| 6,042,724 A | 3/2000 | Gutberlet et al. | |

* cited by examiner

*Primary Examiner*—Duane Smith
*Assistant Examiner*—Douglas J. Theisen
(74) *Attorney, Agent, or Firm*—Richard C. Litman

(57) ABSTRACT

Contaminated water is chemically treated and aerated while being gravity fed through a trough. A series of slats are positioned in the trough to interrupt the flow and induce mixing and aeration. An array of aeration edges is removably installed over the slats. A holder for containing chemical treatment matter therein is positioned adjacent each slat. The aeration edges consist of upper and lower plates stacked one on top of the other. Each plate is provided with horizontal fingers extending in a direction downstream relative to the flow direction of the treated water. Each finger terminates in a baffle, which baffle is positioned substantially perpendicular to its finger.

17 Claims, 3 Drawing Sheets

AERATION AND MIXING TROUGH

BACKGROUND OF THE INVENTION

1. Field of the Invention

The present invention generally relates to purification systems. More specifically, the present invention is drawn to an aeration system for enhancing oxygenation and metal ion precipitation in water purification systems.

2. Description of the Related Art

Contaminated water has caused a myriad of environmental problems in the past four decades. Many manufacturing techniques use water to flush away contaminants, which contaminants can end up in our rivers and streams. This scenario threatens the fish and wildlife that depend on the rivers and streams for sustenance. Such contamination is also a direct threat to the water used for human consumption. Most forward-thinking governments are now committed to improving the quality of the earth's water supply. To this end, inventions have been devised to improve water purification systems. Examples of these inventions are exemplified in U.S. Pat. Nos. 2,673,451 (Gariel), 3,826,740 (Jewett) and 5,492,620 (Evans). The disclosed systems employ multiple compartments having a series of baffles therein to direct water flow. These systems require a relative 1extensive array of pumps and/or conduits.

U.S. Pat. No. 6,042,724 (Gutberlet et al.) is drawn to an apparatus that discloses a water treating apparatus wherein water free-falls over a plurality of stages. The apparatus appears to be difficult to clean and/or repair because of the arrangement of the plural stages.

U.S. Pat. No. 5,069,885 (Ritchie) discloses a non-transparent coil having a photo-reactive, semiconductor material bonded thereto. Water flows along the surfaces of the coil. Light of an activating wavelength permits the photo-reactive surface to detoxify the water. The coiled surfaces are enclosed in a chamber making cleaning and repairing difficult.

U.S. Pat. No. 2,817,440 (Casner et al.) shows a trough structure for classifying selected solids from fluid suspensions.

U.S. Pat. No. 4,536,293 (Babineaux, III) discloses a method of purifying waste-water from oil well rigs. The method incorporates a series of aerators and collection tanks.

None of the above inventions and patents, taken either singly or in combination, is seen to disclose a trough assembly having removable aeration and chemical treatment devices as will subsequently be described and claimed in the instant invention.

SUMMARY OF THE INVENTION

The present, invention is an improvement to existing aeration technology wherein contaminated water is chemically treated and aerated while being gravity-fed through a trough. A series of slats is positioned in the trough to interrupt the flow and induce mixing and aeration. The improvement includes an array of aeration edges removably installed over the slats. Also included is a holder for containing chemical treatment matter therein. The aeration edges consist of upper and lower plates stacked one on top of the other. Each plate is provided with horizontal fingers extending in a direction downstream relative to the flow direction of the treated water. Each finger terminates in a baffle, which baffle is positioned substantially perpendicular to its finger. The fingers of the lower plate are vertically spaced from and extend further downstream than the fingers of the upper plate. The aeration edge assembly greatly enhances aeration and permits the chemical treatment to be more thoroughly mixed with the water. This allows additional precipitation of heavy metals from the water prior to their theoretical precipitation pH point. The aeration edges are sized to fit 4', 2' and 1' troughs. The chemical matter holder is designed to house a conventional chemical gel log.

Accordingly, it is a principal object of the invention to provide a system for enhancing aeration and chemical treatment of contaminated water.

It is another object of the invention to provide a system for enhancing the aeration and chemical treatment of contaminated water, which water is contaminated with heavy metals.

It is a further object of the invention to provide a system for enhancing the aeration and chemical treatment of contaminated water, which system can be easily incorporated with existing water purifying apparatus.

Still another object of the invention is to provide a system for enhancing the aeration and chemical treatment of contaminated water, which system is easy to assemble and involves no moving parts.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
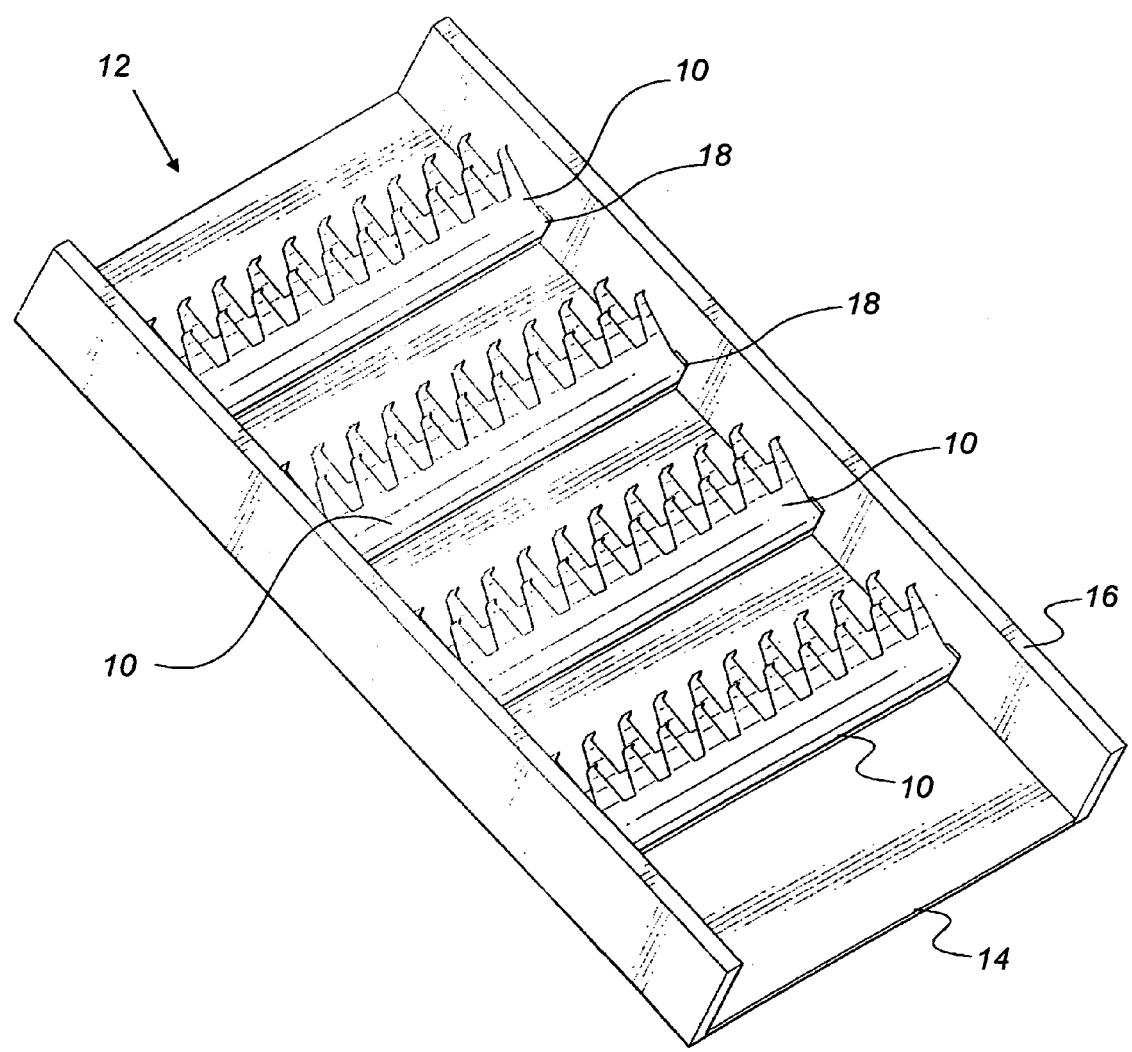
FIG. 1 is an environmental, perspective view of an aeration trough incorporating the aeration edge system according to the present invention.
Figure 2:
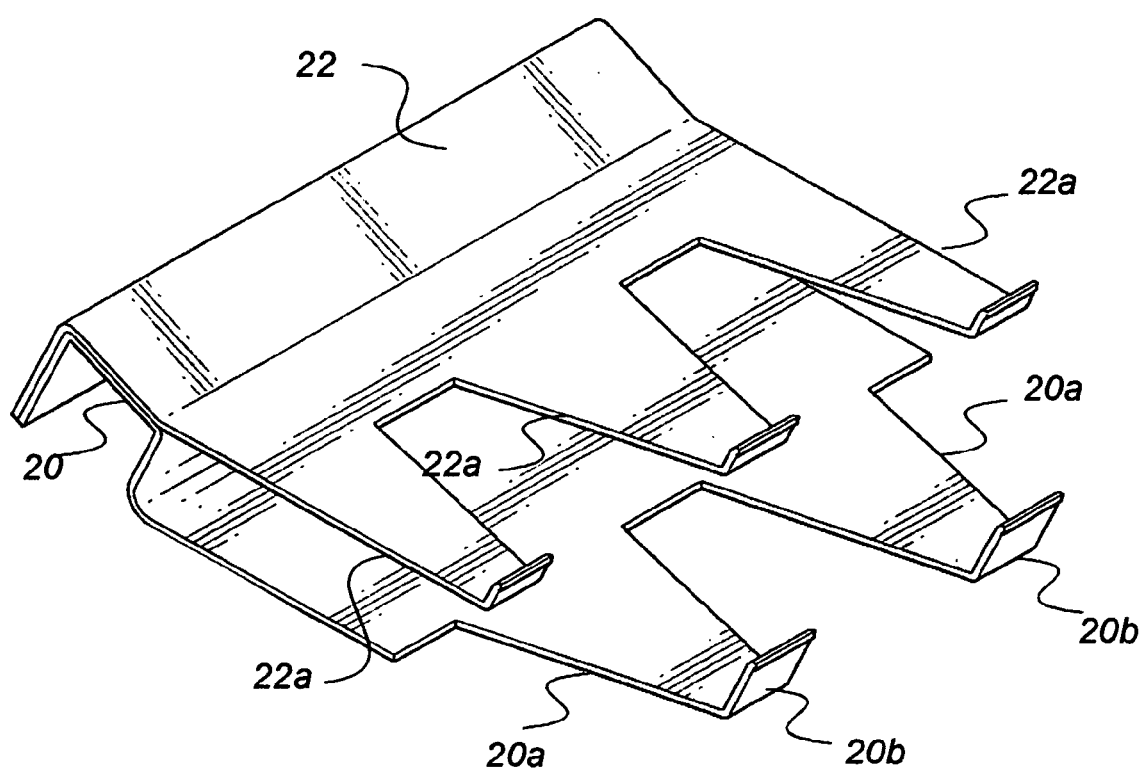
FIG. 2 is a perspective view of an aeration edge according to the present invention.
Figure 3:
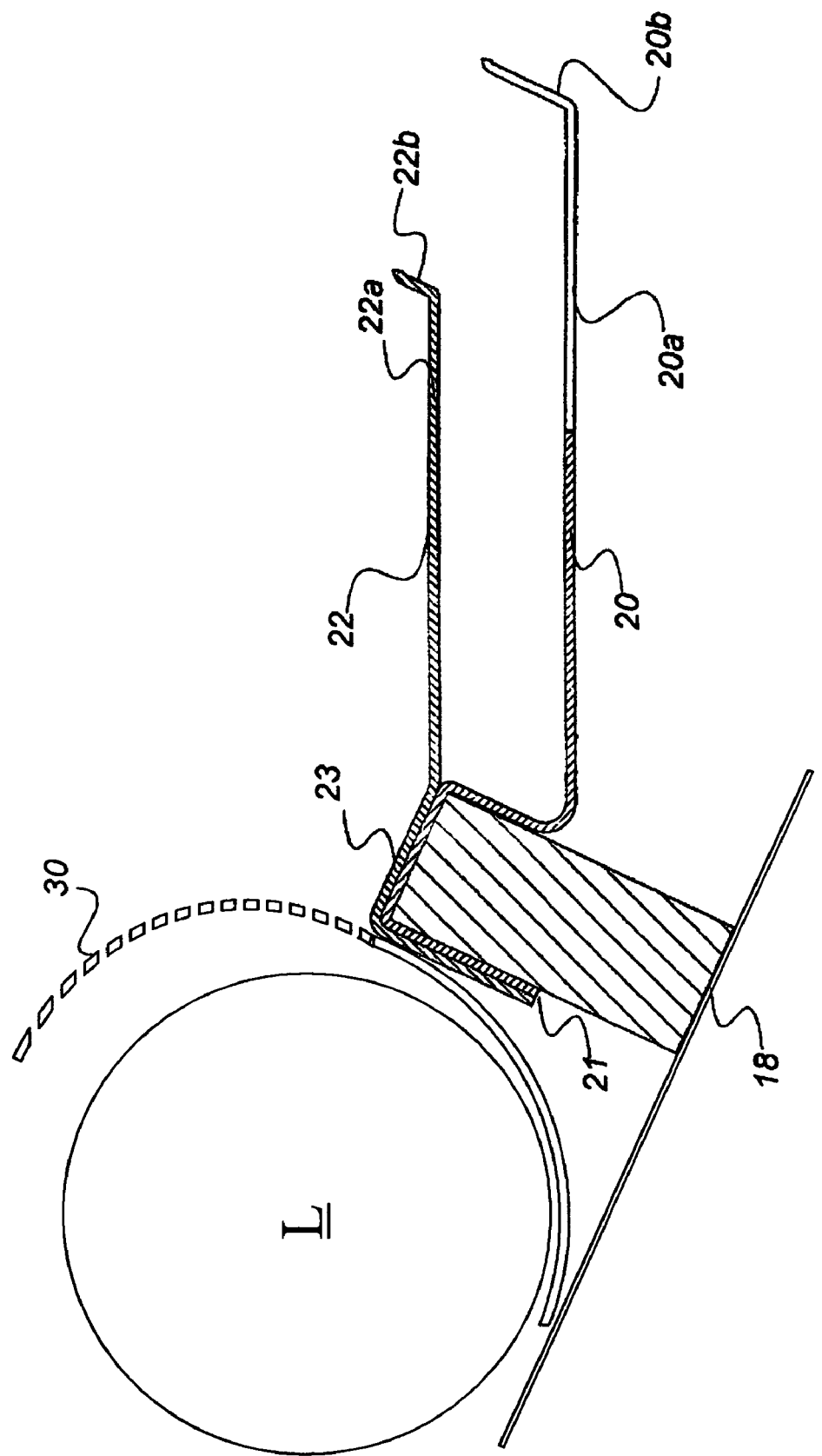
FIG. 3 is a side view of an aeration edge mounted on a trough slat and chemical treatment unit positioned adjacent the upstream face of the slat according to the present invention.

Attention is first directed to FIG. 1 wherein an array of aeration edge units 10 is mounted in a trough 12. Trough 12 comprises a bottom 14 fabricated from marine grade plywood, HDPE or stainless steel. Side panels 16 and slats 18 are fabricated from pressure treated yellow pine, HDPE or stainless steel. The trough is sealed with waterproof silicone. An inset fastening system (not shown) may be provided to secure the trough at an incline. As best seen in FIGS. 2 and 3 an aeration edge unit comprises a bottom plate 20 having a U-shaped end 21 and having plural co-planar fingers 20a extending therefrom. Fingers 20a terminate in respective baffle members 20b. An upper plate 22 having an L-shaped end 23 rests atop plate 20. Plate 22 is also provided with plural co-planar fingers 22a extending therefrom. Fingers 22a are vertically spaced from fingers 20a and are horizontally offset therefrom. Fingers 22a terminate in respective baffle portions 22b. As shown in FIG. 3, plates 20 and 22 are adapted to encompass the top of slat 18 and to rest thereon. The plates can be easily removed from the slat for cleaning or discarding. Plates 20 and 22 may be attached together or made to be separable as desired.

A semi-circular, elongate container 30 (FIG. 3) is positioned on the upstream side of each slat 18. Container 30 is coextensive with the slat. The wall of container 30 is fabricated at its upper portion an open mesh or perforated material. A conventional gel chemical log L is supported within container 30.

In use, a stream of contaminated water is caused to flow (by gravity) down the inclined chute 12. Fingers 20a, 22a along with baffles 20b and 22b cause the stream to disperse to enhance aeration. Water entering container 30 flows under log L and erodes chemicals therefrom and flows outward via the mesh openings. The design of container 30 confines the log therein and permits gradual erosion of the logs chemical content. The combination of stream dispersal and gradual chemical erosion insures that the chemicals will be thoroughly mixed in the stream and that the stream will attain a high degree of aeration.

It is to be understood that the present invention is not limited to the embodiment described above, but encompasses any and all embodiments within the scope of the following claims.

I claim:

1. A system for aeration and chemical treatment of contaminated water, comprising:
    a trough, said trough having at least one slat disposed therein for interrupting a stream of contaminated water flowing in said trough, said at least one slat having an upstream face and a downstream face;
    a device for enhancing aeration and chemical treatment of said stream flowing through said trough, said device being removably mounted on said at least one slat.

2. A system for aeration and chemical treatment of contaminated water as recited in claim 1, wherein there are plural slats disposed in said trough and wherein each slat has a device for enhancing aeration and chemical treatment of said stream flowing through said trough mounted thereon.

3. A system for aeration and chemical treatment of contaminated water as recited in claim 1, wherein said device comprises:
    a first plate having a first end and a second end;
    a plurality of spaced coplanar fingers extending from said first end, wherein said second end is positioned on said slat.

4. A system for aeration and chemical treatment of contaminated water as recited in claim 3, wherein each of said plurality of fingers terminates in a baffle member.

5. A system for aeration and chemical treatment of contaminated water as recited in claim 3, wherein said second end of said first plate is of a U-shaped configuration.

6. A system for aeration and chemical treatment of contaminated water as recited in claim 3, including a housing for containing a chemical log therein, said housing positioned adjacent said upstream face of said slat.

7. A system for aeration and chemical treatment of contaminated water as recited in claim 6, wherein said housing has an upper part and said upper part is fabricated from an open mesh material.

8. A system for aeration and chemical treatment of contaminated water as recited in claim 3, including:
    a second plate having a first end and a second end;
    a plurality of spaced coplanar fingers extending from said first end of said second plate, wherein said second end of said second plate is positioned on said second end of said first plate.

9. A system for aeration and chemical treatment of contaminated water as recited in claim 8, wherein each of said plurality of fingers extending from said first end of said second plate terminates in a baffle member.

10. A system for aeration and chemical treatment of contaminated water, comprising:
    a trough, said trough having at least one slat therein for interrupting a stream of contaminated water flowing in said trough, said at least one slat having an upstream face and a downstream face;
    a first plate having a first end and a U-shaped second end;
    a plurality of spaced coplanar fingers extending from said first end, wherein said second end is positioned on said at least one slat;
    a second plate having a first end and an L-shaped second end;
    a plurality of spaced coplanar fingers extending from said first end of said second plate, wherein said second end of said second plate is positioned on said second end of said first plate.

11. A system for aeration and chemical treatment of contaminated water as recited in claim 10, wherein each of said plurality of coplanar fingers extending from said first end of said first plate and said first end of said second plate terminates in a baffle member.

12. A system for aeration and chemical treatment of contaminated water as recited in claim 11, wherein each baffle member extends perpendicularly to each respective finger.

13. A system for aeration and chemical treatment of contaminated water as recited in claim 10, wherein said plurality of fingers extending from said first end of said first plate are positioned vertically below and are horizontally offset from said plurality of spaced coplanar fingers extending from said first end of said second plate.

14. A system for aeration and chemical treatment of contaminated water as recited in claim 13, including a housing for containing a chemical log therein, said housing positioned adjacent said upstream face of said slat.

15. A system for aeration and chemical treatment of contaminated water as recited in claim 14, wherein said housing has an upper part and said upper part is fabricated from an open mesh material.

16. A system for aeration and chemical treatment of contaminated water as recited in claim 13 wherein said first plate and said second plate are fabricated from stainless steel.

17. A system for aeration and chemical treatment of contaminated water as recited in claim 13, wherein said first plate and said second plate are fabricated from a polycarbonate material.

* * * * *